(12) United States Patent
Kiddy et al.

(10) Patent No.: US 12,071,848 B2
(45) Date of Patent: Aug. 27, 2024

(54) NESTED SPLICE TUBES FOR INTEGRATING SPOOLABLE GAUGES WITH DOWNHOLE CABLES

(71) Applicant: Weatherford Technology Holdings, LLC, Houston, TX (US)

(72) Inventors: Jason S. Kiddy, Gambrills, MD (US); Edward M. Dowd, Landaff, NH (US); Hongbo Li, North Potomac, MD (US)

(73) Assignee: Weatherford Technology Holdings, LLC, Houston, TX (US)

( * ) Notice: Subject to any disclaimer, the term of this patent is extended or adjusted under 35 U.S.C. 154(b) by 7 days.

(21) Appl. No.: 18/088,686

(22) Filed: Dec. 26, 2022

(65) Prior Publication Data

US 2024/0209731 A1   Jun. 27, 2024

(51) Int. Cl.
| | |
|---|---|
| *E21B 47/135* | (2012.01) |
| *G02B 6/255* | (2006.01) |
| *G02B 6/44* | (2006.01) |
| *E21B 47/06* | (2012.01) |

(52) U.S. Cl.
CPC .......... *E21B 47/135* (2020.05); *G02B 6/2551* (2013.01); *G02B 6/4433* (2013.01); *E21B 47/06* (2013.01)

(58) Field of Classification Search
CPC ..... E21B 47/135; E21B 47/06; G02B 6/2551; G02B 6/4433
See application file for complete search history.

(56) References Cited

U.S. PATENT DOCUMENTS

| | | | |
|---|---|---|---|
| 4,580,874 A | 4/1986 | Winter et al. | |
| 5,557,697 A | * 9/1996 | Yoshie | G02B 6/2551 |
| | | | 219/121.64 |
| 6,104,846 A | * 8/2000 | Hodgson | G02B 6/2551 |
| | | | 385/95 |
| 6,919,512 B2 | 7/2005 | Guven et al. | |
| (Continued) | | | |

FOREIGN PATENT DOCUMENTS

| | | |
|---|---|---|
| CA | 2732894 C | 1/2016 |
| CN | 109564334 B | 3/2021 |
| EP | 1739466 A1 | 1/2007 |

OTHER PUBLICATIONS

International Search Report and Written Opinion in PCT/US2023/033594, dated Dec. 12, 2023, 13-pgs.

(Continued)

*Primary Examiner* — Steven A MacDonald
(74) *Attorney, Agent, or Firm* — Cabello Hall Zinda, PLLC

(57) ABSTRACT

A fiber optic cable conducts optical fiber to downhole gauges in a wellbore. Cable connections are used to protect splicing of the optical fiber between cable sections and the gauges. The cable connection includes adjoining tubes, which have passages for the optical fiber. The tubes are nested together and enclose the splicing of the optical fiber. A cable-end tube is affixed to a section of the cable with the passage overlaying a jacket of the cable, and a gauge-end tube is affixed to an end of the downhole gauge with the passage overlaying the end of the downhole gauge. At least one spanning tube has ends that are affixed nested inside the passages of the adjoining ones of the tubes. The cable connections allow the cable and gauges to be wound on a spool or reel for installing into the wellbore.

20 Claims, 6 Drawing Sheets

(56) References Cited

U.S. PATENT DOCUMENTS

| | | |
|---|---|---|
| 7,220,067 B2 | 5/2007 | Rubinstein et al. |
| 9,075,155 B2 | 7/2015 | Luscombe et al. |
| 9,341,778 B2 | 5/2016 | Ducra et al. |
| 10,173,286 B2 | 1/2019 | Dowd et al. |
| 10,246,989 B2 | 4/2019 | Vincelette et al. |
| 2001/0040041 A1 | 11/2001 | Pennington et al. |
| 2001/0041036 A1* | 11/2001 | Nakamura ............ G02B 6/2551 219/121.13 |
| 2001/0041037 A1* | 11/2001 | Nakamura ............ G02B 6/2551 385/96 |
| 2003/0192707 A1 | 10/2003 | Guven et al. |
| 2004/0067002 A1 | 4/2004 | Berg et al. |
| 2005/0123262 A1 | 6/2005 | Dowd et al. |
| 2005/0213898 A1 | 9/2005 | Rubinstein et al. |
| 2005/0263281 A1* | 12/2005 | Lovell .................... E21B 23/12 166/250.07 |
| 2006/0204181 A1 | 9/2006 | Reynolds |
| 2007/0003206 A1* | 1/2007 | Dunphy ............... G02B 6/4248 385/134 |
| 2010/0193200 A1* | 8/2010 | Rioufol ................ E21B 33/134 166/387 |
| 2016/0123135 A1* | 5/2016 | Leeflang ............... E21B 47/017 73/152.52 |
| 2016/0223414 A1 | 8/2016 | Hao et al. |
| 2016/0334579 A1 | 11/2016 | Park et al. |
| 2017/0230232 A1 | 8/2017 | Liu et al. |
| 2021/0041632 A1 | 2/2021 | Antonarulrajah |

OTHER PUBLICATIONS

ITT Corporation, "Electrical Penetrator Systems for Oil and Gas Wells," Brochure, Copyright 2019, 13-pgs.

ITT Corporation, "Presta GS Mechanical Splice: Qualifying Test Results," Brochure, Copyright 2016, 2-pgs.

ITT Corporation, "Presta™ GS Splice," Brochure, Copyright 2015, 2-pgs.

ITT Corporation, "Presta™ Mechanical Splice," Brochure, Copyright 2015, 2-pgs.

Schlumberger, "EDMC-S electric dry-mate connector," Brochure, copyright 2020, 1-pg.

Weatherford, "Downhole Optical Cable," Brochure, Copyright 2005-2008, 3-pgs.

Weatherford, "Optical Gauge Carrier," Brochure, Copyright 2005-2008, 2-pgs.

Weatherford, "Permanent Downhole Monitoring," Brochure, Copyright 2009, 16-pgs.

* cited by examiner

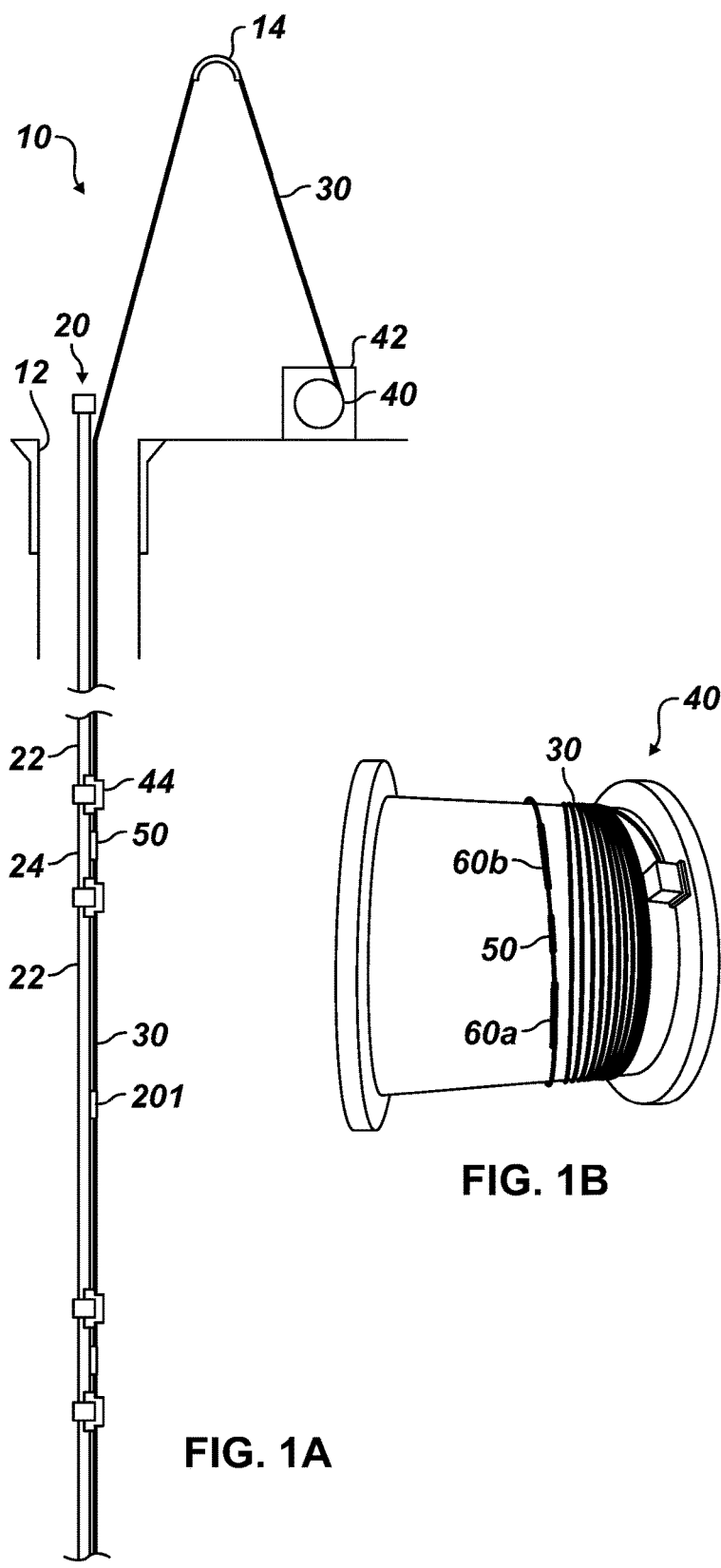
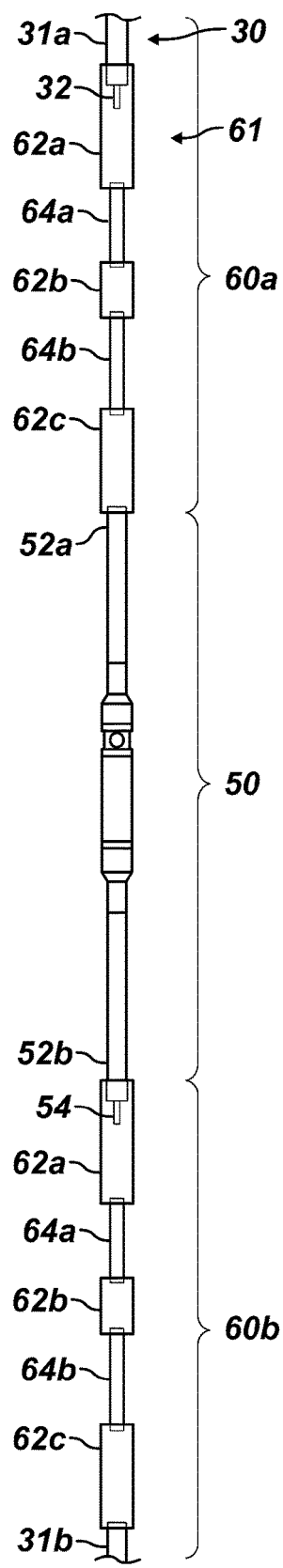
FIG. 1A
FIG. 1B
FIG. 2

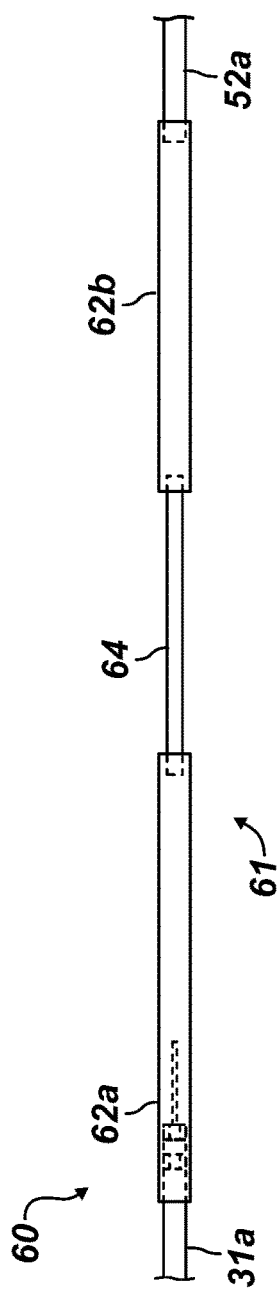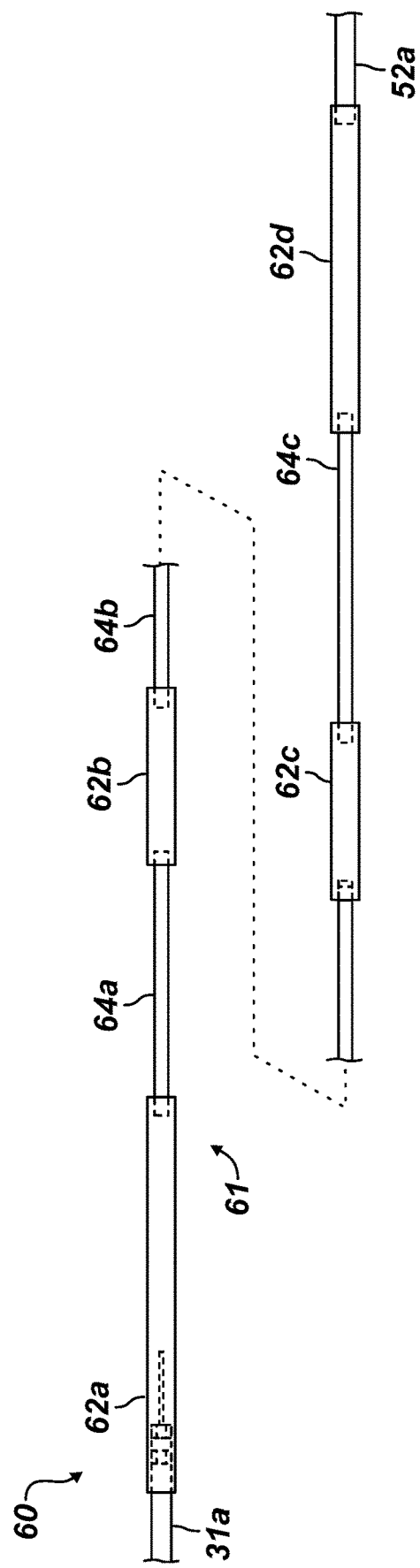
FIG. 6A
FIG. 6B

Design Calculations (Tension & Bending)

| | OD (inch) | Wall Thickness (inch) | Normalized cross sectional area | Normalized bending moment of inertia |
|---|---|---|---|---|
| Ø¼" OD Cable | 0.250 | 0.028 | 1.000 | 1.00 |
| Ø0.23" OD Splice Tube | 0.230 | 0.070 | 1.802 | 1.10 |
| Ø5/16" OD Sleeve | 0.313 | 0.038 | 1.678 | 2.57 |
| Ø5/16" OD Sleeve shoulder section | 0.313 | 0.031 | 1.414 | 2.26 |
| Standard Ø3/8" OD Splice Tube (as reference) | 0.375 | 0.049 | 2.570 | 5.58 |

FIG. 7A

Design Calculations (Pressure Loading)

| | OD (inch) | WT (inch) | ID/OD | von Mises Stress |
|---|---|---|---|---|
| Ø¼" OD Cable (ref) | 0.25 | 0.028 | 0.776 | 130,643 |
| Ø0.23" OD Splice Tube | 0.23 | 0.07 | 0.391 | 61,373 |
| Ø5/16" OD Sleeve | 0.313 | 0.038 | 0.757 | 121,644 |

FIG. 7B

NESTED SPLICE TUBES FOR INTEGRATING SPOOLABLE GAUGES WITH DOWNHOLE CABLES

BACKGROUND OF THE DISCLOSURE

Oil and gas wells are harsh environments due to the chemically active materials and elevated temperatures and pressures that are present. Optical fiber-based instrumentation can be a robust and reliable form of instrumentation used in oil or gas wells as long as the optical fiber is sealed for both hermeticity and mechanical protection.

For these reasons, the optical fiber designed for use in oil or gas wells must be sealed from chemical contaminants. Typically, the optical fiber is placed in a capillary tube that isolates the optical fiber from the environment. The capillary tube can be made of metallic material, such as INCONEL® or stainless steel. (INCONEL is a registered trademark of HUNTINGTON ALLOYS CORPORATION.) For instance, INCONEL® 825 is a specific example of an alloy used for manufacturing the capillary tube for a fiber optic cable. INCONEL® 825 is considered to be a high-performance alloy that offers excellent resistance to heat and corrosion while retaining good mechanical properties, such as resistance to stress-corrosion cracking, localized pitting, and crevice corrosion.

For the fiber-based instrumentation, a downhole gauge for use downhole is connected to a fiber optic cable. Typically, the downhole gauge is installed at the end of the fiber optic cable. A mechanical connection is made between the cable to the downhole gauge in which the optical fiber is spliced together and an outer tube is welded between the cable and downhole gauge to enclose the splicing As is expected, the mechanical connection where optical fiber is joined by fusion splicing can be one of the more common sources of failure in the fiber optic cable. The typical mechanical connection to integrate the gauge with the cable simply uses a large diameter sleeve. As the optical fiber is being fused by splicing, the large diameter sleeve is slid over the cable. Once splicing is complete, the sleeve slides over the splice and affixes to the cable and the gauge. For these reasons, the sleeve is not only larger, but is much stiffer than the surrounding cable, which may not be preferred.

Other methods can be used. For example, the optical fiber can be vibrated out of the cable so there is room for splicing to be performed. The fiber can then be vibrated back into the cable. This method, however, is only useful for a small subset of cable designs.

For these reasons, there is a need in the industry to provide a cable connection that alleviates the drawbacks associated with prior art connections. The subject matter of the present disclosure is directed to overcoming, or at least reducing the effects of, one or more of the problems set forth above.

SUMMARY OF THE DISCLOSURE

A method is disclosed to connect a termination of a fiber optic cable having optical fiber to a downhole gauge. The method comprises: providing a plurality of tubes including a gauge-end tube, a cable-end tube, and one or more spanning tubes, each of the tubes having ends and defining a passage therethrough; affixing the gauge-end tube to a gauge end of the downhole gauge, the passage of the gauge-end tube permitting a gauge fiber end of the optical fiber to extend therethrough; affixing a cable-end tube to the termination of the fiber optic cable, the passage of the cable-end tube permitting a cable fiber end of the optical fiber to extend therethrough; providing access to the gauge and cable fiber ends of the optical fiber by nesting adjoining ones of the tubes together; splicing the gauge and cable fiber ends of the optical fiber together; and enclosing the splicing of the optical fiber by at least partially unnesting the adjoining tubes and affixing the ends the adjoining tubes together.

A cable connection disclosed herein is assembled according to the method described above to protect the splicing of the optical fiber between the fiber optic cable and the downhole gauge for use in a wellbore.

A cable connection is disclosed herein to protect splicing of optical fiber between a fiber optic cable and a downhole gauge for use in a wellbore. The cable connection comprises a plurality of tubes. Each of the tubes has ends and has a passage therethrough for the optical fiber. The tubes include a cable-end tube, a gauge-end tube, and one or more spanning tubes. The cable-end tube is configured to affix to a termination of the cable, and the gauge-end tube is configured to affix to a gauge end of the downhole gauge. The one or more spanning tubes are configured to position between the cable-end tube and the gauge-end tube. Adjoining ones of the tubes are configured to nest together to provide access to splicing of the optical fiber between the fiber optic cable and the downhole gauge. The ends of the adjoining tubes are configured to affix together nested at least partially inside one another to enclose the splicing of the optical fiber.

A fiber optic cable is disclosed herein for conducing optical fiber in a wellbore. The fiber optic cable comprises a cable section, a downhole gauge, and a cable connection. The cable section is of the fiber optic cable in which the optical fiber passes. The downhole gauge is configured to connect with splicing to the optical fiber. The cable connection as described above is configured to protect the splicing of the optical fiber between the fiber optic cable and the downhole gauge.

The foregoing summary is not intended to summarize each potential embodiment or every aspect of the present disclosure.

BRIEF DESCRIPTION OF THE DRAWINGS

FIG. 1A schematically illustrates a tubing string disposed in a wellbore and having a fiber optic cable spooled from a reel.

FIG. 1B illustrates a view of a spool having a fiber optic cable with a gauge and a cable connection according to the present disclosure.

FIG. 2 illustrates a detailed view of a gauge connected by cable connections of the present disclosure to fiber optic cable sections.

FIG. 6A illustrates a detailed view of a cable connection having three nested tubes.

FIG. 6B illustrates a detailed view of a cable connection having seven nested tubes.

FIG. 7A illustrates a graph of tension and bending calculations for the disclosed cable connection.

FIG. 7B illustrates a graph of pressure loading calculations for the disclosed cable connection.

DETAILED DESCRIPTION OF THE DISCLOSURE

Figure 3:
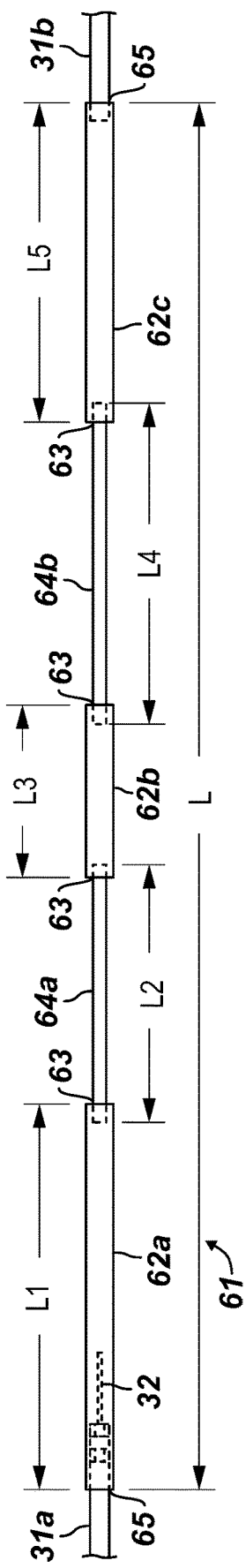
FIG. 3 illustrates a further detailed view of a cable connection between a fiber optic cable section and a gauge.

FIG. 1A schematically illustrates an installation 10 having a tubing string 20 disposed in a wellbore 12 and having a fiber optic cable 30. As is customary, the cable 30 uses a fiber-in-metal-tube (FIMT) structure, having a metal capillary tube that protects optical fiber (not shown) therein. (The optical fiber can include one or more fibers). Various protective structures can be used for the cable 30. For example, an outer protective structure is typically disposed about the capillary tube having the optical fiber. The protective structure can have a polymeric jacket, a polymeric encapsulation, armor, stranding wire, and the like. Depending on the size of the cable 30 and its uses, other conductors, insulation, filler rods, and the like can also be encapsulated in the outer protective structure along with the capillary tube.

The optical fiber carries optical signals, which can convey measurement information, such as pressure and temperature measurements, from downhole gauges or sensors 50. The gauges 50 are spoolable and are attached by mechanical connections to sections of the fiber optic cable 30. The optical fiber is fused by splicing between the cable and spoolable gauges 50. The cable 30 and spoolable gauges 50 are continuously spooled onto a spool, a drum, or a reel 40 for later deployment into a well. Therefore, the mechanical connections used between the spoolable gauges 50 and the cable 30 are also spooled onto the reel 40.

The capillary tube and outer protective structure of the cable 30 protects the optical fiber from the environment. Because elevated temperatures and pressures are prevalent in the subterranean formation, the capillary tube of the cable 30 can be made of metallic material, such as INCONEL® 825, to provide mechanical and thermal protection. The cable 30 typically has a circular cross-sectional shape, but other shapes are possible.

Various forms of equipment can be used for installing the fiber optic cable 30 in the wellbore 12. For example, the fiber optic cable 30 arrives at the installation site wound on a drum or a reel 40. Using conventional reel equipment 42, the fiber optic cable 30 is threaded from the reel 40 through a sheave 14 located on a rig (not shown) or the like at a higher elevation than the reel 40. The outgoing run of the fiber optic cable 30 that leaves the sheave 14 can then be inserted into the wellbore 12.

During installation, the fiber optic cable 30 is unwound from the reel 40 and progressively inserted in the wellbore 12 until the desired depth is reached. For example, the cable 30 can be run along the length of a tubing string 20 being inserted in the wellbore 12 as shown in FIG. 1A. Clamps (not shown), bands 44, and other structures can be used to hold the cable 30 to the tubing string 20.

The insertion of the fiber optic cable 30 in the wellbore 12 is thus a continuous process. Because the fiber optic cable 30 has been completely assembled at the manufacturing site, there is no need to make any cable splices at the installation site, and the fiber optic cable 30 installs by being unwound from the reel 40 and pushed in the wellbore 12 until reaching the intended installation depth.

For this reason, the fiber optic cable 30 has a structure allowing the cable 30 to bend without being damaged. The cable 30 is mostly subjected to bends during the manufacturing and installation process so that the cable 30 need to resist those bending stresses without damage that would otherwise undermine its long-term reliability.

The bend stresses to which the fiber optic cable 30 are subjected during manufacturing occur when the fiber optic cable 30 is wound on the reel 40. Another bend stress arises during the installation of the fiber optic cable 30 when the cable 30 is unwound. The most severe bending stress typically arises when the fiber optic cable 30 passes over the sheave 14 because the sheave 14 can have a radius of curvature that is smaller than the radius of the reel 40 and any elbow radius that may be present in the wellbore 12. For instance, a first bend occurs at the sheave 14 when the fiber optic cable 30 enters the sheave 14 and curves around it, and a second bend occurs when the fiber optic cable 30 exits the sheave 14 and straightens out to enter the wellbore 12.

The external diameter of the cable 30 is preferably as small as possible so the cable 30 takes as little space as possible in the wellbore 12. For example, the fiber optic cable 30 can have a cross-sectional dimension in the range from about 0.1 inch to about 0.625 inch.

The length of the fiber optic cable 30 can vary depending on the installation. The range of lengths can be between several hundred meters to several kilometers. Given such lengths, being able to spool the cable 30 on the reel 40 facilitates transportation of the cable 30. Because the fiber optic cable 30 is spoolable on the spool or reel 40, the cable 30 is sufficiently thin and flexible to be wound on the reel 40 and transported in a wound configuration between the manufacturing facility and the installation site.

At periodic positions along its length, the cable 30 includes the spoolable downhole gauges 50, which can be any suitable sensors or transducers for measuring environmental conditions (pressure, temperature, etc.) in the wellbore 12. For example, the spoolable gauges 50 can be annular gauges and tubing-ported spoolable gauges. As shown in FIG. 1A, a tubing stand 22 can have a spoolable gauge 50 run adjacent thereto. As also shown, a mandrel 24 on the tubing string 20 can have a spoolable gauge 50. The cable 30 runs along the tubing string 20 and connects the optical fiber in the cable 30 to the various spoolable gauges 50. Because the fiber optic cable 30 is spoolable on the reel 40, the features of the fiber optic cable 30, the spoolable gauges 50, and the connections between them need to avoid being damaged when wound on and off the reel 40 and when being fed through equipment for placement in the wellbore 12.

FIG. 1B illustrates a view of a reel 40 having a portion of fiber optic cable 30 with a spoolable gauge 50. Cable connections or splice protectors 60a-b according to the present disclosure connect the spoolable gauge 50 in line with sections of the cable 30. As its name implies, the connection 60a-b forms a protective cover for the splicing of optical fiber between the cable 30 and the spoolable gauge 50. As also implied, the connection 60a-b forms a mechanical connection between the spoolable gauge 50 and the cable 30. The cable connections 60a-b preferably have similar mechanical properties (size, bending stiffness, axial strength, pressure rating, etc.) as the cable 30.

As discussed above, sections of the cable 30 are spliced together to build up the length required for the installation. The splicing is used to arrange the spoolable gauges 50 in selected positions along the length of the fiber optic cable 30 to meet the needs of the installation so that prefabricated sections of the cable 30 have the spoolable gauges 50 for measuring different parameters, such as temperature and/or pressure, at desired depths in the wellbore 12. The cable 30 is custom built for the installation by splicing the spoolable gauges 50 to plain cable sections that have no sensing capability. With this approach, the fiber optic cable 30 can have the desired sensing capability at the desired location on the cable 30 (the desired position between the cable sections) and over the desired length.

The cable connection 60 of the present disclosure protects the splice of the optical fiber between the spoolable gauge 50 and the adjoining sections of the cable 30. The connection 60 can also be used to protect the splice of the optical fiber between adjoining section of the cable 30. The cable connection 60 affixes to the outer protective structure of the fiber optic cable 30 and affixes to the end of the spoolable gauge 50 to mechanically protect the splice made in the optical fiber of the cable 30.

FIG. 2 illustrates a detailed view of a spoolable gauge 50 connected by cable connections 60*a-b* of the present disclosure to adjoining sections 31*a-b* of fiber optic cable 30. Each cable connection 60*a-b* is configured to connect the end of a cable section 31*a-b* to an end 52*a-b* of the gauge 50 to protect passage and splicing of the optical fiber. The cable connections 60*a-b* engage the protective structure of the cable sections 31*a-b* on both sides of the gauge 50 to provide stable support.

The cable connection 60*a-b* includes a plurality of tubes 61 that are nested and affixed together to enclose the passage of optical fiber. In the present implementation, the nested tubes 61 include splice tubes 62*a-c* and spanning tubes 64*a-b*. Each of the nested tubes 61 has a longitudinal passageway, such as a throughbore, through which the optical fiber (not shown) can be threaded. The spanning tubes 64*a-b* have a smaller diameter to nest in the splice tubes 62*a-c*, and the splice tubes 62*a-c* have a larger diameter to nest on the spanning tubes 64*a-b* and terminations of the cable sections 31*a-b* and ends 52*a-b* of the spoolable gauge 50.

As specifically shown in FIG. 3, an uphole cable connection 60*a* connects an uphole cable section 31*a* to a spoolable downhole gauge 50, and a downhole cable connection 60*b* connects the spoolable gauge 50 to a downhole cable section 31*b*. (Uphole and downhole refer here to the relative placement in a wellbore.) For the uphole cable connection 60*a*, a cable-end splice tube 62*a* has one end affixed at 65 to the protective structure of the cable section 31*a*, which includes part of a capillary tube 32 extending therefrom. Another end of the cable-end splice tube 62*a* is affixed at 63 to a first spanning tube 64*a* inserted partially therein. An intermediate spanning tube 62*b* has one end affixed at 63 to the first spanning tube 64*a* and has another end affixed at 63 to a second spanning tube 64*b* inserted partially therein. A gauge-end splice tube 62*c* has one end affixed at 63 to the second spanning tube 64*b* inserted partially therein and has another end affixed at 65 to the uphole end 52*a* of the spoolable gauge 50.

The downhole cable connection 60*b* in FIG. 2 is similarly arranged from one end to the other. Instead of being in mirror symmetry, the order of the tubes 61 is repeated from the spoolable gauge 50 to the second cable section 31*b*. For the downhole cable connection 60*b* as shown in FIG. 2, a first splice tube 62*a*, which is gauge-end, has one end affixed to the end 52*b* of the spoolable gauge 50, which has a portion of a capillary tube extending therefrom. Another end of the gauge-end splice tube 62*a* is affixed to a first spanning tube 64*a* inserted partially therein. An intermediate spanning tube 62*b* has one end affixed to the first spanning tube 64*a* and has another end affixed to a second spanning tube 64*b* inserted partially therein. A second splice tube 62*c*, which is cable-end, has one end affixed to the second spanning tube 64*b* inserted partially therein and has another end affixed to the second cable section 30*b*.

The order of the nested tubes 61 in the cable connections 60*a-b* is repeated end-to-end on both ends 52*a-b* of the spoolable gauge 50 to accommodate how the cable 30 is spooled from the reel (40) and through the sheave (14) and other installation equipment used to insert in the wellbore (12). As noted, most of the bending experienced by the cable connections 60*a-b* occurs when unwinding the cable 30 from the reel (40) and passing it through the sheave (14) and any other installation equipment. By contrast, winding the cable 30 and the spoolable gauges 50 on the reel (40) during manufacture can be a more controlled process that avoids excessive bending. Therefore, the uphole and downhole connections 60*a-b* are arranged in the same direction for encountering bending during unspooling and passage through the sheave (14) and the like.

Returning to FIG. 3, the overall length L of the cable connection (e.g., the uphole connection 60*a* shown here) can be configured for a particular implementation and for a particular diameter of the fiber optic cable 30. Namely, because the cable 30 is spooled on a reel (40), different sections of the cable 30 are wound at different radii of curvature as the cable 30 is spooled onto itself. The overall length L of the cable connection 60*a* can be configured to accommodate a radius of curvature expected for the associated section of the cable 30 when wound on a reel (40). The overall length L of the cable connection 60*a* can also be configured based on the length of the spoolable gauge 50 to which it connects. These and other factors may be considered.

The individual lengths L1, L2, L3, L4, and L5 for the splice tubes 62*a-c* and spanning tubes 64*a-b* can be varied to define the rigidity and flexibility of the cable connection 60*a* connect between the cable section 31*a* and the gauge end 52*a*. The present example is based on the uphole cable connection 60*a* used between a 0.25-inch diameter cable 30 and a comparable end 52*a* of a spoolable downhole gauge 50. The end tubes 64*a*, 64*c* have lengths L1, L5 that are about 11 and 14 inches, respectively. The intermediate splice tube 64*b* has a length L3 of about 6 inches. For their part, the spanning tubes 64*a-b* have lengths L2, L4 of about 8.5 and 14 inches, respectively. Overlap between the nested tubes 61 can be about 0.5 inch, and the cable-end tube 62*a* can have an overlap of about 1 inch to cover any hex and roll crimps on the cable 30.

For this implementation, the 11-inch end tube 62*a* can have an outer diameter of 0.3125 inch and an inner diameter of 0.235 inch. One end is bored with a 0.255-inch diameter to fit over the cable 30 with a depth of 1.25 inch. A step feature can be left on the non-bored end, but a step feature may not be left on bored end of the tube 62*a*. The 14-inch end tube 62*c* can also have an outer diameter of 0.3125 inch and an inner diameter of 0.235 inch. One end can be bored with a 0.255-inch diameter to fit over the gauge end 52*a* for a depth of 0.50 inch. A step feature can be left on non-bored end, but a step feature may not be left on bored end. The 6-inch intermediate tube 62*b* can have an outer diameter of 0.3125 inch and an inner diameter of 0.235 inch. Outer diameters of the spanning tubes 64*a-b* can be configured to nest inside the splice tubes 62*a-c*.

As noted, the protective structure of the cable 30 is typically composed of metal, such as INCONEL or stainless steel. The spoolable gauge 50 is also typically composed of metal, such as INCONEL® 718. The nested tubes 61 are also composed of metal, such as INCONEL® 825.

Figure 4:
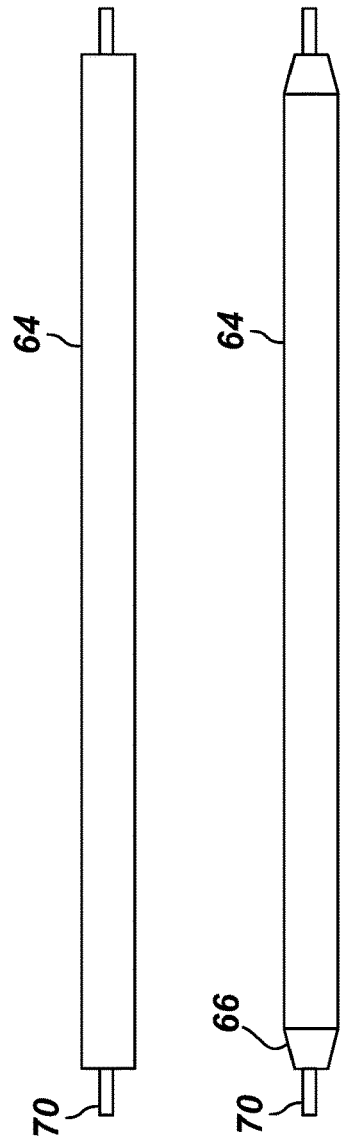
FIG. 4 illustrates an isolated view of heat sink assemblies for use with the disclosed cable connections.

To protect the optical fiber during manufacture and use, heat sink assemblies can be used inside the nested tubes 61, and in particular inside the spanning tubes 64a-b. For instance, FIG. 4 illustrates an isolated view of spanning tubes 64 having heat sinks 70 mounted therein. The heat sinks 70 include a copper tube inserted in the spanning tube 64 and extending a short extent beyond the ends of the spanning tubes 64. As shown here and noted previously, the spanning tube 64, which can be 14 and 8.5-inches long, can have an outer diameter of 0.230 inch The copper heat sink tube 70 can have an outer diameter of 0.083 inch and an inner diameter of 0.031 inch. The copper heat sink tube 70 is cut an extent of about 0.5 inch longer than the tube to allow about 0.25 inch to extend from both ends of the tube 64. As a further example, the spanning tube 64 can be swaged at its ends 66 where the tube 64 insert into the outer splice tubes (62) as noted previously.

Figure 5A:
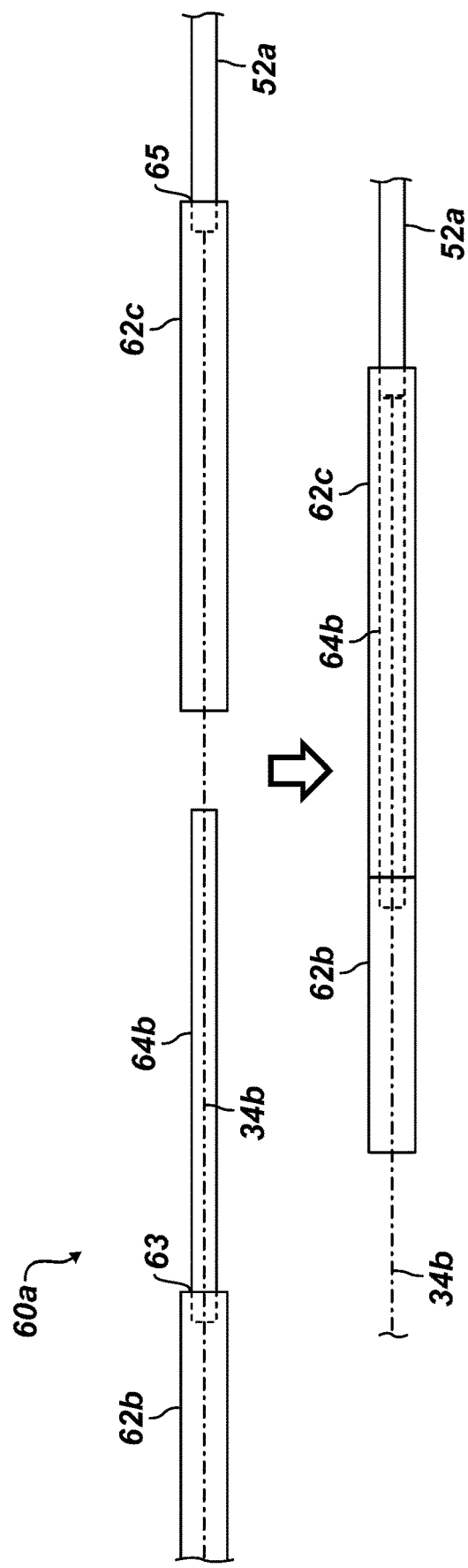
FIG. 5A illustrates stages of manufacturing a gauge side of the disclosed cable connection.
Figure 5B:
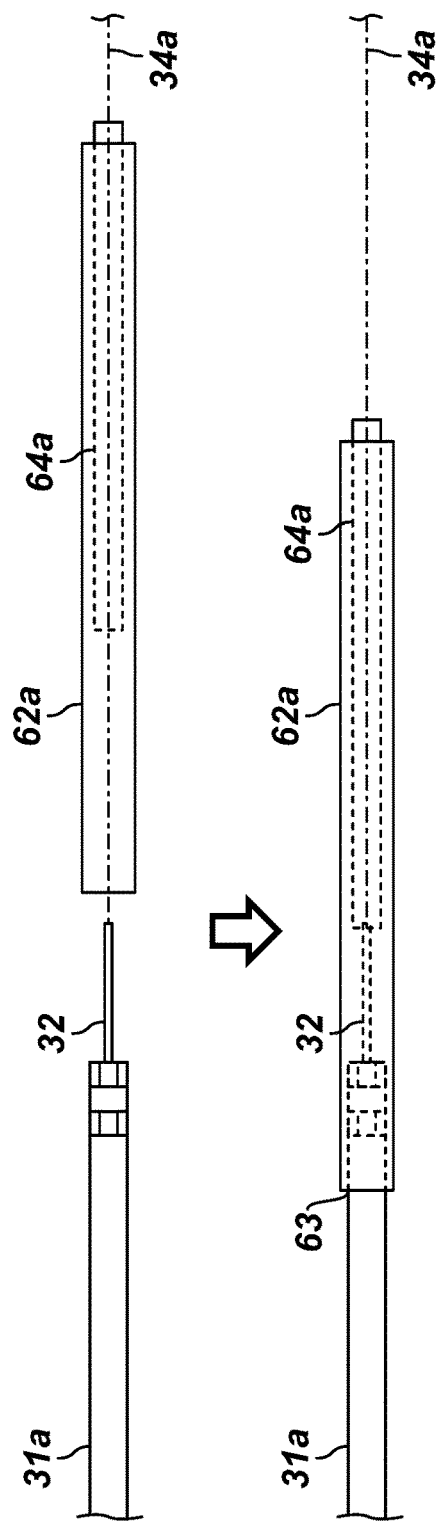
FIG. 5B illustrates stages of manufacturing a cable side of the disclosed cable connection.

FIGS. 5A-5B illustrate assembly stages for manufacturing the disclosed cable connection, which is an uphole cable connection 60a in the examples. Comparable steps can be performed with necessary modifications for a downhole cable connection. In the manufacture, tubes (61), including a cable-end tube 62a, a gauge-end tube 62c, and one or more spanning tubes 64a-b and 62b, are provided. Each of the tubes (61) has ends and defines a passage therethrough. The gauge-end tube 62c is affixed to a gauge end 52a of the downhole gauge (50). The passage of the gauge-end tube 62c permits a gauge fiber end 34b of the optical fiber 34 to extend therethrough. The cable-end tube 62a is affixed to the termination of the cable section 31a of the fiber optic cable 30, and the passage of the cable-end tube 62a permits a cable fiber end 34a of the optical fiber 34 to extend therethrough. Access to the gauge and cable fiber ends 34a-b of the optical fiber is provided by nesting adjoining ones of the tubes (61) together. The gauge and cable fiber ends 34a-b of the optical fiber 34 are spliced together. Then, the splicing 36 of the optical fiber 34 is enclosed by at least partially unnesting the adjoining tubes and affixing the ends the adjoining tubes (61) together.

Nesting of the tubes (61) is done to provide room for performing splicing and the optical fiber can be accessed. Once the splicing is completed, the tubes (61) can be unnested and affixed (welded) together at their joints. Heat sinks are preferably used at least temporarily when the end tubes 62a, 62c are affixed to the gauge end and cable termination. Additionally, heat sinks are preferably used when the intermediate tube 62b is affixed to the other spanning tubes 64a-b. These heat sinks may remain in place after assembly.

FIG. 5A shows assembly steps for the gauge side of the uphole cable connection 60a. The intermediate spanning tube 62b is affixed (e.g., pre-welded or mechanically attached) at 63 to the second spanning tube 64b, which preferably has a copper heat sink (not shown) swaged therein. The splice tube 62c is threaded on the pigtail of the optical fiber 34 extending from the gauge end 52a, and the tube 62c is affixed (e.g., welded or mechanically attached) at 65 to the gauge end 52a. A temporary heat sink (not shown) can be used for protection.

The second spanning tube 64b and the intermediate tube 64b are threaded on the pigtail of the fiber 34, and the spanning tube 64b is inserted into the gauge-end splice tube 64c so the optical fiber 34 can pass from the gauge end 52a and through the tubes 62c, 64b, 62b for eventual splicing.

FIG. 5B shows assembly steps for the cable side of the cable connection 60a. The first spanning tube 64a is inserted in the cable-side splice tube 62a, and the two tubes 62a, 64a are threaded on the pigtail of the optical fiber 34 from the cable section 31a so the optical fiber 34 passes through them. The cable-end splice tube 62a is connected to the terminated end of the cable section 31a, which has portion of the capillary tube 32 extending therefrom. Meanwhile, the spanning tube 64a preferably has a copper heat sink (not shown) swaged therein.

Figure 5C:
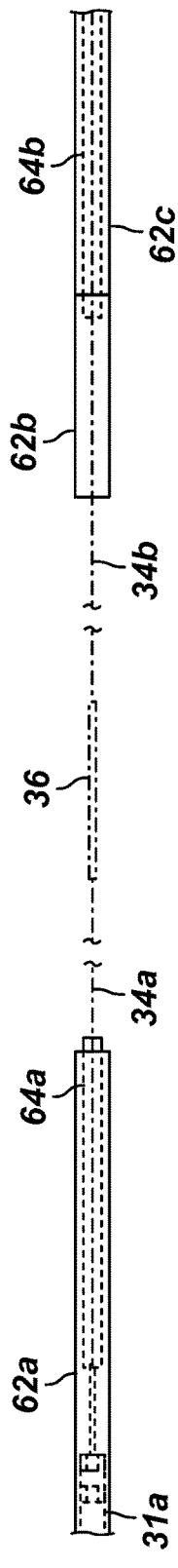
FIGS. 5C-5D illustrate stages of combining the cable and gauge sides of the disclosed cable connection.
Figure 5D:
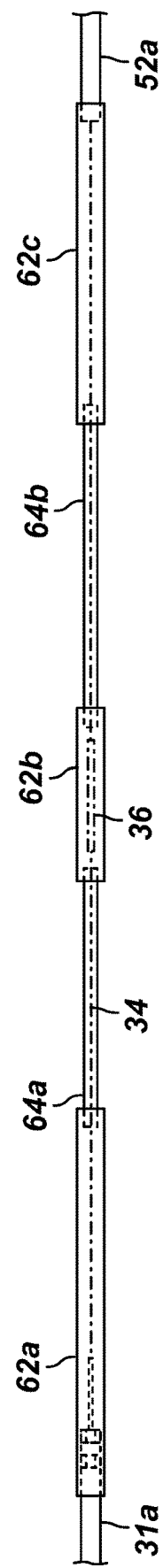

As shown in FIG. 5C, the optical fiber 34 is spliced together with a splicing 36 using techniques known in the art while the nested tubes 61 are withdrawn respectively toward the cable and gauge sides. As then shown in FIG. 5D, the nested tubes 61 are brought together over the splicing 36 of the optical fiber 34. The first spanning tube 62a is then affixed (e.g., welded) to the cable-end tube 62a and the intermediate tube 64b respectively at 63. As noted, the spanning tube 64a preferably has a copper heat sink (not shown) swaged therein to protect the optical fiber 34.

In the implementation shown here and as in FIGS. 2-3, the cable connections 60a-b each include five tubes 61, but more or less can be used. In FIG. 6A, for example, three nested tubes 61 can be used, in which two end splice tubes 62a-b can have one spanning tube 64 nested between them. Alternatively, as shown in FIG. 6B, seven nested tubes 61 can be used, in which four splice tubes 62a-d have three spanning tubes 64a-c nested between them.

As can be seen by the proposed solution, multiple nested tubes 61 slide over one another such that portions of the tubes 61 nest inside one another. This allows the tubes 61 to be withdrawn during assembly so there is room to perform the optical splices of the optical fiber 34. Once the optical splices are complete, the nested tubes 61 can be extended to cover the entire length of optical fiber 34 between the cable section 31 and end 52 of the spoolable gauge 50. The nested tubes 61 are then welded (or mechanically connected) together and to the gauge/cable to provide a continuous structure. Preferably, all of the nested tubes 61 have mechanical properties similar to the downhole cable 30.

FIG. 7A illustrates a graph of tension and bending calculations for the disclosed cable connection. The calculations are based on a 0.25-inch diameter fiber optic cable. Other calculations can be based on other dimensions. The 0.25-inch diameter fiber optic cable has a wall thickness of 0.028 (inch), a normalized cross-sectional area of 1.000, and a normalized bending moment of inertial of 1.00. Values are shown for each of the nested tubes 61 of the disclosed cable connection 60, including 0.23-inch diameter spanning tubes 64, the 0.3125-inch diameter splice tubes 62, and the 0.3125-inch diameter splice tube having a shoulder section. For reference, values are also shown for a 0.375-inch diameter sleeve. As can be seen, all of the splice tubes of the cable connection are stiffer and stronger than the 0.25-inch diameter cable 30.

FIG. 7B illustrates a graph of pressure loading calculations for the disclosed cable connection. The calculations are based on a 0.25-inch diameter fiber optic cable. Other calculations can be based on other dimensions. The 0.25-inch diameter fiber optic cable has a wall thickness of 0.0285 (inch), an ID-to-OD ratio of 0.776, and a von Mises stress of 130,643. As is known, von Mises stress is used to determine whether a given material will yield or fracture. The 0.23-inch diameter spanning tube 64 has a wall thickness of 0.07 inch, an ID-to-OD ratio of 0.391, and a von Mises stress of 61,373. The 0.3125-inch diameter splice tube 62 has a wall thickness of 0.038 (inch), an ID-to-OD ratio of 0.757, and a von Mises stress of 121,644. As can be seen, all of the tubes 61 of the cable connection 60 are slightly stiffer and stronger than the 0.25-inch diameter cable 30, which equates to each of the tubes having a pressure rating greater than that of the cable.

Each of the tubes 61 for the cable connection 60 has a length and/or a material configured to flex during bending. Compared to the traditional method of using a single, larger splice tube to protect the splice of an optical fiber, the cable connection 60 with the nested tubes 61 has a much lower bending stiffness allowing it to be more readily spooled onto a drum or reel 40 with the downhole cable 30 and spoolable gauges 50. Compared to the 'vibrating method', the proposed solution is compatible with standard downhole cable designs, is easier to implement, and is applicable to a larger number of optical fibers.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method to connect a termination of a fiber optic cable having optical fiber to a downhole gauge, the method comprising:
   providing a plurality of tubes including a gauge-end tube, a cable-end tube, one or more inner tubes, and one or more spanning tubes, each of the tubes having ends and defining a passage therethrough;
   affixing the gauge-end tube to a gauge end of the downhole gauge, the passage of the gauge-end tube permitting a gauge fiber end of the optical fiber to extend therethrough;
   affixing the cable-end tube to the termination of the fiber optic cable, the passage of the cable-end tube permitting a cable fiber end of the optical fiber to extend therethrough;
   installing the one or more inner tubes and the one or more spanning tubes on the optical fiber by passing the optical fiber through the passage of the one or more inner tubes and the one or more spanning tubes, each of the one or more inner tubes being configured as a heat sink inside the passage of a respective one of the one or more spanning tubes, the ends of each inner tube extending beyond the ends of the respective spanning tube;
   providing access to the gauge fiber end and the cable fiber end of the optical fiber by nesting adjoining ones of the tubes together;
   splicing the gauge fiber end and the cable fiber end of the optical fiber together; and
   enclosing the splicing of the optical fiber by:
      at least partially unnesting the adjoining tubes; and
      affixing the ends the adjoining tubes together by welding together the ends on the one or more spanning tubes partially nested inside the passages of the adjoining tubes; and
      protecting the optical fiber with the heat sink of the one or more inner tubes at the ends on the one or more spanning tubes welded and partially nested inside the passages of the adjoining tubes.

2. The method of claim 1, wherein the one or more spanning tubes include a cable-side spanning tube, a gauge-side spanning tube, and an intermediate tube; and wherein the method comprises:
   adjoining the cable-side spanning tube to the cable-end tube, the cable-side spanning tube being configured to nest inside the passage of the cable-end tube;
   adjoining the gauge-side spanning tube to the gauge-end tube, the gauge-side spanning tube being configured to nest inside the passage of the gauge-end tube; and
   adjoining the intermediate tube between the cable-side and gauge-side spanning tubes, either of the cable-side and gauge-side spanning tubes being configured to nest in the intermediate tube.

3. The method of claim 2, wherein the fiber optic cable is an uphole section of the fiber optic cable; and wherein:
   the gauge end of the downhole gauge is an uphole end of the downhole gauge;
   the gauge-end tube has a first length longer than a second length of the cable-end tube, the second length being greater than a third length of the intermediate tube;
   the gauge-side spanning tube is longer than the cable-side spanning tube; and
   the third length of the intermediate tube is shorter than the cable-side spanning tube.

4. The method of claim 2, wherein the fiber optic cable is a downhole section of the fiber optic cable; and wherein:
   the gauge end of the downhole gauge is a downhole end of the downhole gauge;
   the cable-end tube has a first length longer than a second length of the gauge-end tube, the second length being greater than a third length of the intermediate tube;
   the cable-side spanning tube is longer than the gauge-side spanning tube; and
   the third length of the intermediate tube is shorter than the gauge-side spanning tube.

5. The method of claim 2, wherein protecting portion of the optical fiber, using the one or more inner tubes as the heat sink, at the ends on the one or more spanning tubes welded and partially nested inside the passages of the adjoining tubes comprises:
   protecting the optical fiber with the heat sink of a first of the one or more inner tubes at the ends on the cable-side spanning tube welded and partially nested inside the passages of the cable-end tube and the intermediate tube; and
   protecting the optical fiber with the heat sink of a second of the one or more inner tubes at the ends on the gauge-side spanning tube welded and partially nested inside the passages of the gauge-end tube and the intermediate tube.

6. The method of claim 1, wherein affixing the gauge-end tube to the gauge end of the downhole gauge comprises inserting a temporary heat sink on the gauge fiber end of the optical fiber and welding the gauge-end tube to the gauge end of the downhole gauge.

7. The method of claim 1, wherein affixing the cable-end tube to the termination comprises welding the cable-end tube to the termination.

8. The method of claim 1, wherein unnesting the adjoining tubes and affixing the ends the adjoining tubes together comprises:
   installing a heat sink tube on the optical fiber exposed beyond the ends of the one or more spanning tubes; and welding the ends of the one or more spanning tube inside the passages of the adjoining ones of the tubes.

9. A cable connection assembled according to the method of claim 1 to protect the splicing of the optical fiber between the fiber optic cable and the downhole gauge for use in a wellbore.

10. The method of claim 5, wherein providing the plurality of tubes comprises providing the tubes each having at least one of: a length configured to flex during bending; a material configured to flex during bending; a first stiffness greater than a second stiffness of the fiber optic cable; and a first pressure rating greater than a second pressure rating of the fiber optic cable.

11. A cable connection to protect splicing of optical fiber between a fiber optic cable and a downhole gauge for use in a wellbore, the cable connection comprising:
   a plurality of tubes, each of the tubes having ends and having a passage therethrough for the optical fiber, the tubes including:
      a cable-end tube configured to affix to a termination of the fiber optic cable;
      a gauge-end tube configured to affix to a gauge end of the downhole gauge;
      one or more spanning tubes configured to position between the cable-end tube and the gauge-end tube; and
      one or more inner tubes being configured as a heat sink inside the passages of respective ones of the one or more spanning tubes, the ends of each inner tube extending beyond the ends of the respective spanning tube,
   wherein adjoining ones of the tubes are configured to nest together to provide access to splicing of the optical fiber between the fiber optic cable and the downhole gauge;
   wherein the ends of the adjoining tubes nested at least partially inside one another are configured to weld together to enclose the splicing of the optical fiber; and
   wherein the one or more inner tubes protect the optical fiber as the heat sink at the ends on the one or more spanning tubes welded and partially nested inside the passages of the adjoining tubes.

12. The cable connection of claim 11, wherein the one or more spanning tubes include a cable-side spanning tube, a gauge-side spanning tube, and an intermediate tube, the cable-side spanning tube adjoining the cable-end tube, the gauge-side spanning tube adjoining the gauge-end tube, the intermediate tube being configured to adjoin between the cable-side spanning tubes and the gauge-side spanning tube.

13. The cable connection of claim 12, wherein the termination of the fiber optic cable is an uphole termination; and wherein:
   the end of the downhole gauge is an uphole end of the downhole gauge;
   the gauge-end tube has a first length longer than a second length of the cable-end tube, the second length being greater than a third length of the intermediate tube;
   the gauge-side spanning tube is longer than the cable-side spanning tube; and
   the third length of the intermediate tube is shorter than the cable-side spanning tube.

14. The cable connection of claim 12, wherein the termination of the fiber optic cable is a downhole termination; and wherein:
   the end of the downhole gauge is a downhole end of the downhole gauge;
   the cable-end tube has a first length longer than a second length of the gauge-end tube, the second length being greater than a third length of the intermediate tube;
   the cable-side spanning tube is longer than the gauge-side spanning tube; and
   the third length of the intermediate tube is shorter than the gauge-side spanning tube.

15. The cable connection of claim 12, wherein:
   a first of the one or more inner tubes protects the optical fiber as the heat sink at the ends on the cable-side spanning tube welded and partially nested inside the passages of the cable-end tube and the intermediate tube; and
   a second of the one or more inner tubes protects the optical fiber as the heat sink at the ends on the gauge-side spanning tube welded and partially nested inside the passages of the gauge-end tube and the intermediate tube.

16. The cable connection of claim 11, wherein each of the tubes has a length and/or a material configured to flex during bending.

17. The cable connection of claim 11, wherein each of the tubes has a first stiffness greater than a second stiffness of the fiber optic cable.

18. The cable connection of claim 11, wherein each of the tubes has a first pressure rating greater than a second pressure rating of the fiber optic cable.

19. A fiber optic cable for conducing optical fiber in a wellbore, the fiber optic cable comprising:
   a cable section of the fiber optic cable in which the optical fiber passes;
   a downhole gauge configured to connect with splicing to the optical fiber; and
   a cable connection configured to protect the splicing of the optical fiber between the fiber optic cable and the downhole gauge, the cable connection comprising:
      a plurality of tubes, each of the tubes having ends and having a passage therethrough for the optical fiber, the tubes including:
         a cable-end tube configured to affix to a termination of the fiber optic cable;
         a gauge-end tube configured to affix to a gauge end of the downhole gauge;
         one or more spanning tubes configured to position between the cable-end tube and the gauge-end tube; and
         one or more inner tubes being configured as a heat sink inside the passages of respective ones of the one or more spanning tubes, the ends of each inner tube extending beyond the ends of the respective spanning tube,
      wherein adjoining ones of the tubes are configured to nest together to provide access to splicing of the optical fiber between the fiber optic cable and the downhole gauge;
      wherein the ends of the adjoining tubes nested at least partially inside one another are configured to weld together to enclose the splicing of the optical fiber; and
      wherein the one or more inner tubes protect the optical fiber as the heat sink at the ends on the one or more spanning tubes welded and partially nested inside the passages of the adjoining tubes.

20. The cable connection of claim 11, wherein the one or more spanning tubes comprise:
   one or more splice tubes; and
   one or more nesting tubes configured to nest inside the passage of the one or more splice tubes, each of the one or more nesting tubes having a respective one of the one or more inner tubes, the ends of the one or more nesting tubes being swaged.

\* \* \* \* \*